United States Patent
Deutsch et al.

(10) Patent No.: US 9,964,183 B2
(45) Date of Patent: May 8, 2018

(54) TRANSMISSION WITH HIGH SPEED CLUTCH HUB

(71) Applicant: Ford Global Technologies, LLC, Dearborn, MI (US)

(72) Inventors: Laurence Andrew Deutsch, Farmington Hills, MI (US); Gregory Daniel Goleski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 505 days.

(21) Appl. No.: 14/684,549

(22) Filed: Apr. 13, 2015

(65) Prior Publication Data

US 2016/0298697 A1   Oct. 13, 2016

(51) Int. Cl.
| | |
|---|---|
| *F16H 55/17* | (2006.01) |
| *F16H 3/48* | (2006.01) |
| *F16D 13/68* | (2006.01) |
| *F16D 13/72* | (2006.01) |
| *F16D 25/0638* | (2006.01) |
| *F16D 25/10* | (2006.01) |
| *F16H 3/66* | (2006.01) |
| *F16D 21/02* | (2006.01) |

(52) U.S. Cl.
CPC ............. *F16H 3/48* (2013.01); *F16D 13/683* (2013.01); *F16D 13/72* (2013.01); *F16D 25/0638* (2013.01); *F16D 25/10* (2013.01); *F16H 3/66* (2013.01); *F16D 21/02* (2013.01); *F16D 2300/0214* (2013.01); *F16H 2200/006* (2013.01); *F16H 2200/2012* (2013.01); *F16H 2200/2046* (2013.01); *F16H 2200/2066* (2013.01); *F16H 2200/2082* (2013.01)

(58) Field of Classification Search
CPC ........... F16H 3/48; F16D 13/683; F16D 13/72
See application file for complete search history.

(56) References Cited

U.S. PATENT DOCUMENTS

| | | | |
|---|---|---|---|
| 6,095,941 A | * | 8/2000 | Martin ....................... F16H 3/66 192/45.008 |
| 6,708,809 B2 | | 3/2004 | McClay |
| 7,007,783 B2 | | 3/2006 | Gerathewohl et al. |
| 7,566,287 B2 | | 7/2009 | Onishi et al. |
| 7,971,690 B2 | | 7/2011 | Imaizumi |
| 8,607,952 B2 | | 12/2013 | Keating et al. |

FOREIGN PATENT DOCUMENTS

JP    2012207715 A    10/2012

* cited by examiner

*Primary Examiner* — Derek D Knight
(74) *Attorney, Agent, or Firm* — James Dottavio; Brooks Kushman P.C.

(57) ABSTRACT

A clutch hub is selectively held against rotation by a brake and selectively coupled to an input shaft by a clutch. The clutch pack for the brake is splined to the outside of the clutch hub while the clutch pack for the clutch is splined to the inside. To reduce axial length, the clutch packs are packaged radially outside of a gear set, increasing the diameter of the clutch hub. When the clutch hub is subjected to high rotational speeds, high centrifugal stresses result. These stresses are reduced by openings in the spline teeth and in the recesses between the spline teeth. Fluid flow to the outer clutch pack is controlled by openings in a clutch housing.

20 Claims, 4 Drawing Sheets

TRANSMISSION WITH HIGH SPEED CLUTCH HUB

TECHNICAL FIELD

This disclosure relates to the field of automatic transmissions for motor vehicles. More particularly, the disclosure pertains to a clutch hub designed to reduce centrifugal stress.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

A common type of automatic transmission utilizes a collection of clutches and brakes. Various subsets of the clutches and brakes are engaged to establish the various speed ratios. A common type of clutch utilizes a clutch pack having separator plates splined to a housing and interleaved with friction plates splined to a rotating shell. When the separator plates and the friction plates are forced together, torque may be transmitted between the housing and the shell. Typically, a separator plate on one end of the clutch pack, called a reaction plate, is axially held to the housing. A piston applies axial force to a separator plate on the opposite end of the clutch pack, called a pressure plate, compressing the clutch pack. The piston force is generated by supplying pressurized fluid to a chamber between the housing and the piston. For a brake, the housing may be integrated into the transmission case. For a clutch, the housing rotates. As the pressurized fluid flows from the stationary transmission case to the rotating housing, it may need to cross one or more interfaces between components rotating at different speeds. At each interface, seals direct the flow from an opening in one component into an opening in the interfacing component.

In a rear wheel drive vehicle, the engine and transmission are commonly mounted along a longitudinal axis of the vehicle, perpendicular to the axis about which the wheels rotate. Power from a transmission output shaft is conveyed by a driveshaft to a differential assembly which changes the axis of rotation, multiplies the torque by a final drive ratio, and permits the wheels to rotate at slightly different speeds. In a front wheel drive vehicle, the engine and transmission are commonly mounted transversely, such that the engine crankshaft rotates about an axis parallel to the axis about which the wheels rotate. In a front wheel drive vehicle, it is common to combine the transmission and the differential into a single unit called a transaxle.

Several vehicle design trends combine to limit the space available for a transaxle. A desire to limit the frontal area to reduce drag and improve styling tends to reduce the engine compartment width. Switching from engines with the cylinders arranged in a V pattern to engines with the cylinders inline increases the length of the engine. At the same time, the number of distinct transmission ratios has been tending to increase, increasing the number of parts required in the transmission. Consequently, transaxles must be designed with some components radially within other components in order to minimize the total axial length.

SUMMARY OF THE DISCLOSURE

A transmission includes a clutch hub, a transmission case, and a first clutch pack. The clutch hub includes a first annular section defining a plurality of external teeth separated by a plurality of recesses. Friction plates of the first clutch pack are splined to the external teeth. Separator plates of the first clutch pack are splined to the transmission case. The external teeth extend outside a nominal diameter whereas the recesses do not extend outside the nominal diameter. A majority of the teeth and a majority of the recesses define openings to reduce centrifugal loading on the clutch hub. The transmission may include a second clutch pack. Separator plates of the second clutch pack may be splined to internal teeth on a second annular section of the clutch hub. Friction plates of the second clutch pack may be splined to a clutch housing. The internal teeth on the second annular section of the clutch hub may be separated by a second plurality of recesses. The internal teeth and the second plurality of recesses may also define openings to further reduce centrifugal loading. A third clutch pack may include separator plates splined to the clutch housing and friction plates splined to a ring gear. Fluid flow to the first clutch pack may be regulated by holes in the clutch housing.

A clutch hub includes a first annular section defining a plurality of external teeth separated by a plurality of recesses. The external teeth extend outside a nominal diameter whereas the recesses do not extend outside the nominal diameter. A majority of the teeth and a majority of the recesses define openings to reduce centrifugal loading on the clutch hub. The clutch hub may include a second annular section defining a plurality of internal teeth separated by a second plurality of recesses. The internal teeth and the second plurality of recesses may also define openings to further reduce centrifugal loading.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes.

Figure 1:
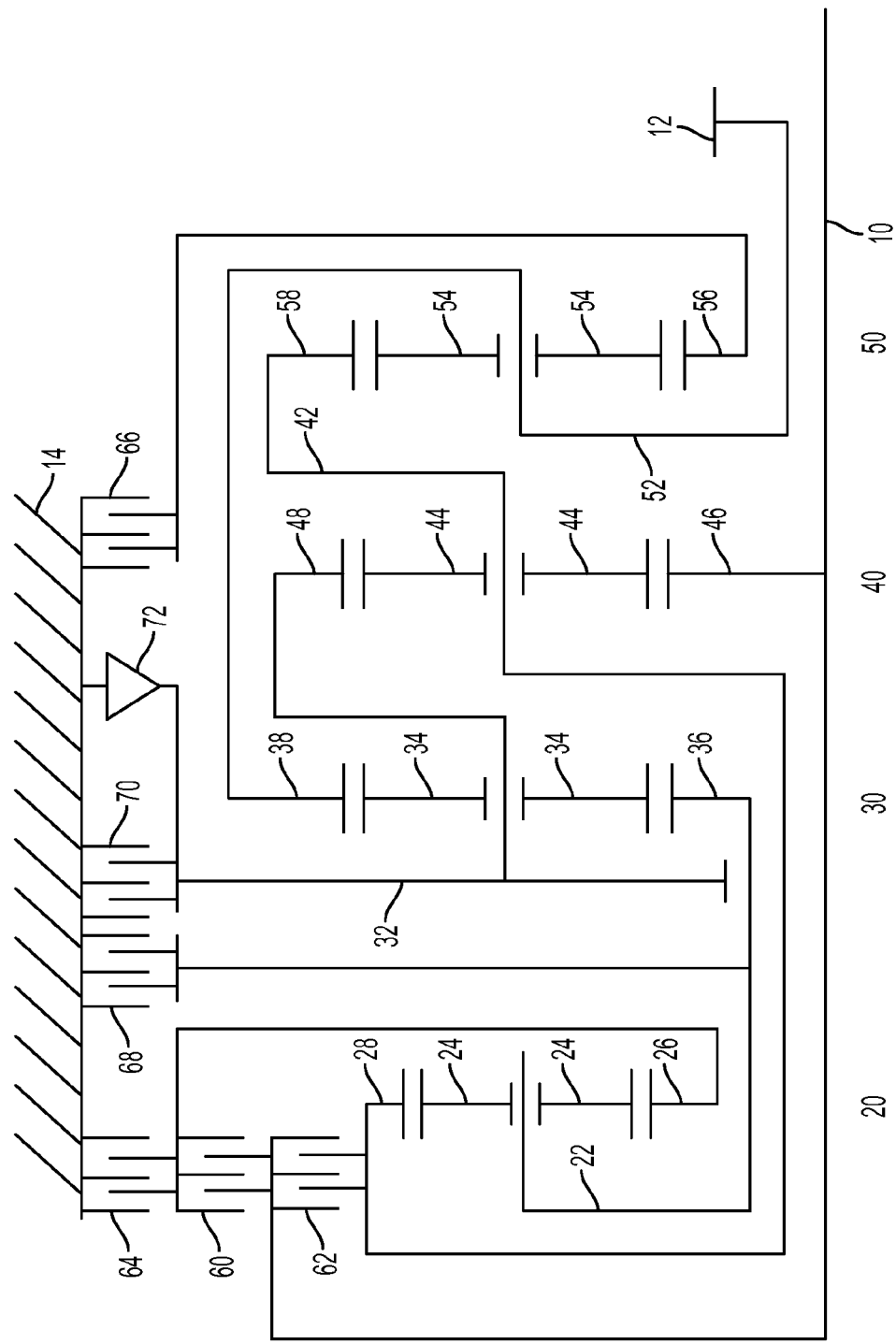
FIG. 1 is a schematic representation of a transmission gearing arrangement.

A transmission gearing arrangement is illustrated schematically in FIG. 1. Input shaft 10 is driven by an internal combustion engine, potentially via a launch device such as a torque converter. Output 12 drives the vehicle wheels, potentially via gearing and a differential. The various components of the gearing arrangement are supported within a transmission case 14 that is fixed to vehicle structure. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears 24 mesh with external gear teeth on a sun gear 26 and with internal gear teeth on a ring gear 28. Sun gear 26 and ring gear 28 are supported to rotate about the same axis as the carrier. Gear sets 30, 40, and 50 are similarly structured.

Sun gear 46 is fixedly coupled to input shaft 10. Ring gear 38 and carrier 52 are fixedly coupled to output 12. Carrier 22 is fixedly coupled to sun gear 36. Ring gear 28, carrier 42, and ring gear 58 are mutually fixedly coupled. Carrier 32 is fixedly coupled to ring gear 48. Clutch 62 selectively couples ring gear 28 to input shaft. Sun gear 26 is selectively coupled to input shaft 10 by clutch 60 and selectively held against rotation by brake 64. Brake 66 selectively holds sun gear 56 against rotation. Brake 68 selectively holds carrier 22 and sun gear 36 against rotation. Carrier 32 and ring gear 48 are selectively held against rotation by brake 70 and passively held against rotation in one direction by one way brake 72.

As shown in Table 1, engaging the shift elements in combinations of two establishes eight forward speed ratios and one reverse speed ratio between input shaft 10 and output 12. An X indicates that the shift element is required to establish the speed ratio.

TABLE 1

|     | 60 | 62 | 64 | 66 | 68 | 70/72 | Ratio | Step |
|-----|----|----|----|----|----|-------|-------|------|
| Rev | X  |    |    |    |    | X     | -3.79 | 89%  |
| $1^{st}$ |    |    |    | X  |    | X     | 4.26  |      |
| $2^{nd}$ |    |    |    | X  | X  |       | 2.73  | 1.56 |
| $3^{rd}$ |    |    | X  | X  |    |       | 2.19  | 1.25 |
| $4^{th}$ | X  |    |    | X  |    |       | 1.71  | 1.28 |
| $5^{th}$ |    | X  |    | X  |    |       | 1.33  | 1.29 |
| $6^{th}$ | X  | X  |    |    |    |       | 1.00  | 1.33 |
| $7^{th}$ |    | X  | X  |    |    |       | 0.85  | 1.18 |
| $8^{th}$ |    | X  |    |    | X  |       | 0.69  | 1.23 |

Figure 2:
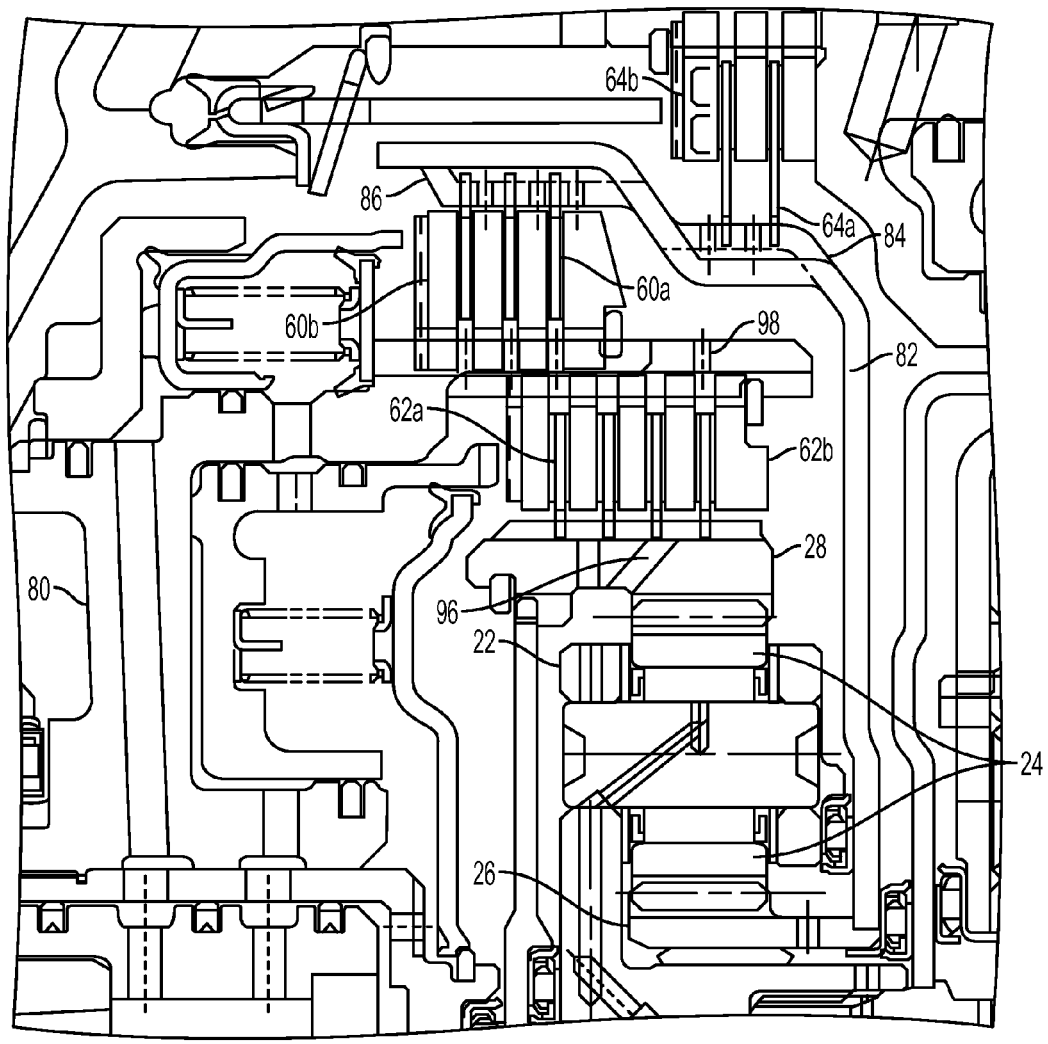
FIG. 2 is a partial cross section of a transaxle according to the gearing arrangement of FIG. 1.

FIG. 2 shows a partial cross section of a transmission following the gearing arrangement of FIG. 1. Clutch housing 80 is fixedly coupled to gearbox input shaft 10. In order to reduce axial length, the clutch packs of clutches 60 and 62 and brake 64 are located radially outside ring gear 28. Clutch hub 82 extends radially from sun gear 26. The clutch pack for brake 64 includes a plurality of separator plates 64b splined to the transmission case interspersed with at least one friction plate 64a splined to external spline teeth 84 formed into a first annular section of clutch hub 82. The first annular section has a nominal diameter less than a nominal inner diameter of the friction plates 64a. External spline teeth 84 extend outwardly beyond this nominal diameter. Internal spline teeth on each friction plate 64a extend into recesses between the spline teeth 84, preventing relative rotation between hub 82 and friction plates 64a. The clutch pack for clutch 60 includes a plurality of separator plates 60b splined to clutch housing 80 interspersed with at least one friction plate 60a splined to internal spline teeth 86 formed into a second annular section of clutch hub 82. The second annular section has a nominal diameter greater than a nominal outer diameter of the friction plates 60a. Internal spline teeth 86 extend inwardly beyond this nominal diameter. External spline teeth on each friction plate 60a extend into recesses between the spline teeth 86, preventing relative rotation between hub 82 and friction plates 60a. The clutch pack for clutch 62 includes a plurality of separator plates 62b splined to clutch housing 80 interspersed with at least one friction plate 62a splined to ring gear 28.

In $5^{th}$ gear, sun gear 26 rotates at more than two and a half times the speed of gearbox input shaft 10. Gearbox input shaft 10 may rotate at the maximum speed of the engine, which may be over 6000 rpm. Therefore, sun gear 26 and clutch hub 82 may rotate at over 15,000 rpm in $5^{th}$ gear. Since the annular sections of clutch hub 82 extend outside of the clutch packs for clutches 60 and 62, which are located radially outside gear set 20, clutch hub 82 has a relatively large diameter. The combination of relatively large diameter and relatively high rotational speed results in high centrifugally generated stress in clutch hub 82 and large deflections of hub 82 in $5^{th}$ gear.

Figure 3:
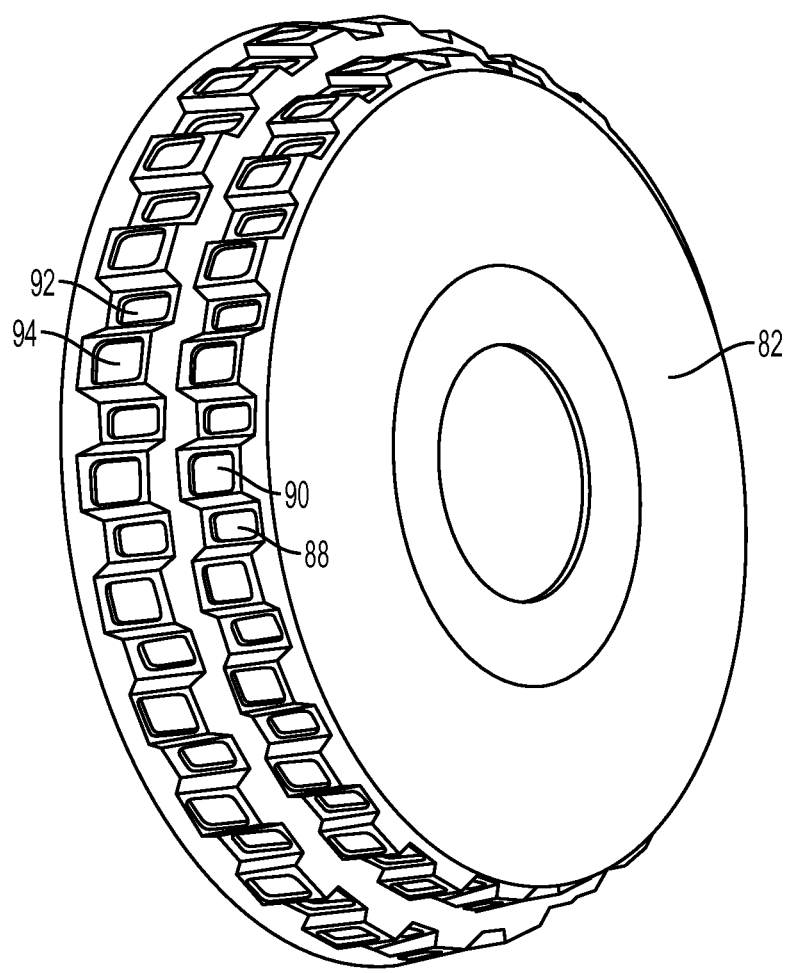
FIGS. 3 and 4 are pictorial views of a clutch shell suitable for the gearing arrangement of FIG. 1.
Figure 4:
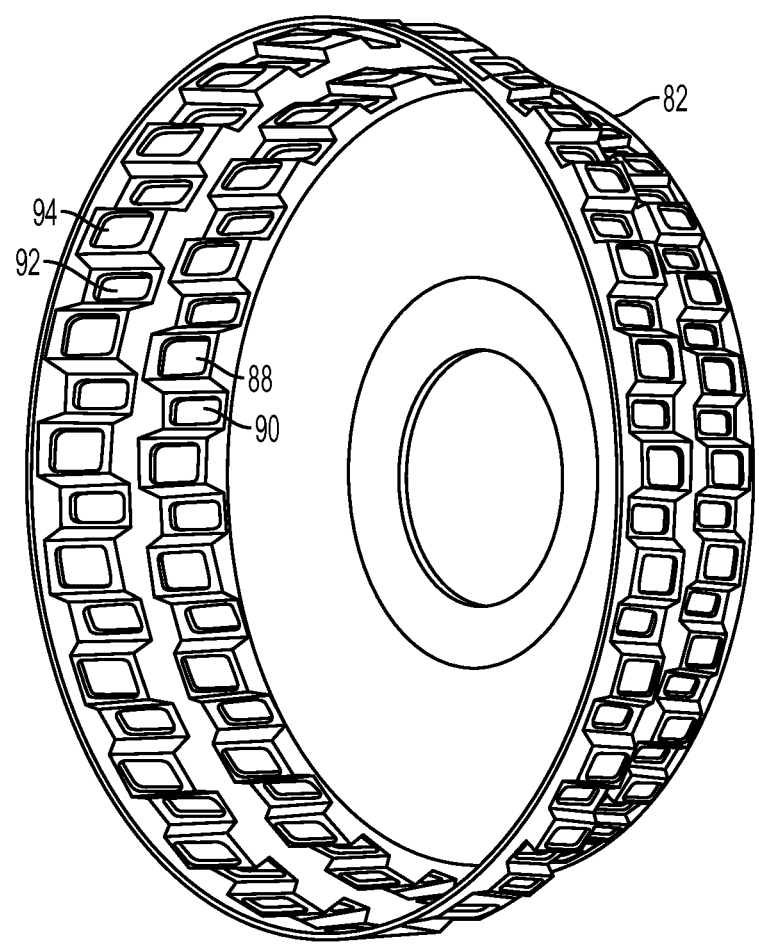

Typically, excessive deflection in a sheet metal component is resolved by increasing the material thickness to increase stiffness of the part. However, with regard to clutch hub 82, the stress levels and deflections may be reduced by removing material from appropriate locations. FIGS. 3 and 4 show clutch hub 82 pictorially. Rectangular openings with rounded corners are formed into the spline teeth and into the recesses between spline teeth. Specifically, openings 88 are formed into the recesses between spline teeth 84 in the first annular section. Openings 90 are formed into external spline teeth 84 in the first annular section. Openings 92 are formed into internal spline teeth 86 in the second annular section. Finally, openings 94 are formed into the recesses between spline teeth 86 in the second annular section. Finite element analysis indicates a stress reduction of over 10% relative to a similar part without the openings. Deflections are also measurably reduced.

A wet clutch pack requires a supply of fluid flowing between the separator plates and friction plates in order to maintain desirable friction coefficient properties and to remove heat. However, excessive fluid flow may increase parasitic drag when the clutch is disengaged. In some circumstances, small holes are provided in a clutch hub to regulate the flow of fluid. When the hub is rotating, fluid tends to gather at the interior surfaces as a result of centrifugal forces. A small hole allows an appropriate amount of the fluid to flow through the clutch hub into the clutch pack. The openings in clutch hub 82, however, are much too large to regulate the flow rate of fluid.

As shown in FIG. 2, other parts of the transmission are designed to provide fluid to the interior surface of clutch hub 82 at a rate suitable for brake 64. As fluid flows outward, hole 96 in ring gear 28 permits a suitable amount to flow through the clutch pack of clutch 62. A number of holes in clutch housing 80, including hole 98, direct the fluid as it exits the clutch pack of clutch 62. Oil flowing out of hole 98 continues radially outward to the clutch pack for brake 64. Oil flowing out of hole 100 continues radially outward to the clutch pack of clutch 60.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a clutch hub having a first annular section with a first nominal diameter, the first annular section defining a plurality of external teeth extending outside the first nominal diameter and separated by a first plurality of recesses not extending outside the first nominal diameter, a majority of the teeth and a majority of the recesses defining openings to reduce centrifugal loading on the clutch hub.

2. The transmission of claim 1 further comprising:
   a transmission case; and
   a first clutch pack including a first plurality of separator plates splined to the transmission case and at least one first friction plate interspersed with the first plurality of separator plates and splined to the clutch hub via the plurality of external teeth.

3. The transmission of claim 2 further comprising:
   a planetary gear set having a sun gear fixedly coupled to the clutch hub, a carrier, a ring gear, and a plurality of planet gears supported for rotation with respect to the carrier and meshing with both the sun gear and the ring gear.

4. The transmission of claim 3 wherein:
   the clutch hub includes a second annular section having a second nominal diameter, the second annular section defining a plurality of internal teeth extending inside the second nominal diameter and separated by a second plurality of recesses not extending inside the second nominal diameter.

5. The transmission of claim 4 wherein a majority of the internal teeth defines openings.

6. The transmission of claim 5 wherein a majority of the second plurality of recesses defines openings.

7. The transmission of claim 4 wherein a majority of the second plurality of recesses defines openings.

8. The transmission of claim 4 further comprising:
   a clutch housing; and
   a second clutch pack including a second plurality of separator plates splined to the clutch housing and at least one second friction plate interspersed with the second plurality of separator plates and splined to the clutch hub via the plurality of internal teeth.

9. The transmission of claim 8 further comprising:
   a third clutch pack including a third plurality of separator plates splined to the clutch housing and at least one third friction plate interspersed with the third plurality of separator plates and splined to the ring gear.

10. The transmission of claim 8 wherein the clutch housing defines a plurality of holes configured to regulate a flow of fluid to the first clutch pack.

11. The transmission of claim 8 wherein the clutch housing is fixedly coupled to a gearbox input shaft.

12. A clutch hub comprising:
    a first annular section having a first nominal diameter, the first annular section defining a plurality of external teeth extending outside the first nominal diameter and separated by a first plurality of recesses not extending outside the first nominal diameter, a majority of the teeth and a majority of the recesses defining openings to reduce centrifugal loading on the clutch hub.

13. The clutch hub of claim 12 further comprising:
    a second annular section having a second nominal diameter, the second annular section defining a plurality of internal teeth extending inside the second nominal diameter and separated by a second plurality of recesses not extending inside the second nominal diameter.

14. The clutch hub of claim 13 wherein a majority of the internal teeth defines openings to further reduce centrifugal loading on the clutch hub.

15. The clutch hub of claim 14 wherein a majority of the second plurality of recesses defines openings to further reduce centrifugal loading on the clutch hub.

16. The clutch hub of claim 13 wherein a majority of the second plurality of recesses defines openings to further reduce centrifugal loading on the clutch hub.

17. A clutch hub comprising:
    a first annular section having a first nominal diameter, the first annular section defining a plurality of external teeth extending outside the first nominal diameter and separated by a first plurality of recesses not extending outside the first nominal diameter, a majority of the first plurality of recesses defining openings; and a second annular section having a second nominal diameter, the second annular section defining a plurality of internal teeth extending inside the second nominal diameter and separated by a second plurality of recesses not extending inside the second nominal diameter, a majority of the internal teeth defining openings.

18. The clutch hub of claim 17 wherein a majority of the external teeth defines openings.

19. The clutch hub of claim 18 wherein a majority of the second plurality of recesses defines openings.

20. The clutch hub of claim 17 wherein a majority of the second plurality of recesses defines openings.

* * * * *